United States Patent

[11] 3,626,157

[72] Inventors William R. Smith;
Neal L. Walters, both of Raleigh, N.C.

[21] Appl. No. 828,545
[22] Filed May 28, 1969
[45] Patented Dec. 7, 1971

[73] Assignee International Business Machines Corporation
Armonk, N.Y.

[54] FIELD-EFFECT PERFORATED MEDIA READER
10 Claims, 6 Drawing Figs.

[52] U.S. Cl. ........ 235/61.11 A, 307/251, 340/173 SP
[51] Int. Cl. ........ G06k 7/06, G11c 13/00, H03k 17/60
[50] Field of Search ........ 235/61.12, 61.11; 307/304, 251; 340/173 SP

[56] References Cited

UNITED STATES PATENTS

| | | | |
|---|---|---|---|
| 2,949,226 | 8/1960 | Lubkin | 235/61.12 X |
| 3,142,823 | 7/1964 | Lewin et al. | 235/61.12 X |
| 3,171,100 | 2/1965 | Rajchman | 235/61.12 X |
| 3,189,745 | 6/1965 | Van Reymersdal | 235/61.11 (E) X |
| 3,248,710 | 4/1966 | Stapper | 235/61.11 (A) X |

OTHER REFERENCES

IBM Technical Disclosure Bulletins: Ordemann, " Read Only Memory," Vol. 4, No. 3, August 1961, pages 23 & 24

Scheerer, " Dielectric Sensing Arrangement," Vol. 11, No. 4, Sept. 1968, page 435

Lehman et al., " Formation of Depletion and Enhancement Mode FET's"; Vol. 8, No. 4 pages 675 & 676

Heitzman, " Chip Read-Only Memory," IBM Technical Disclosure Bulletin, Vol. 8, No. 2, July 1965, p. 333 & 334

*Primary Examiner*—Maynard R. Wilbur
*Assistant Examiner*—Thomas J. Sloyan
*Attorneys*—Hanifin and Jancin and John B. Frisone

ABSTRACT: A perforated media reader using field-effect devices for sensors in which the media acts as one electrode of selected sensors as a function of the perforation pattern, thereby generating discrete signals indicating the location of the perforations.

INVENTORS
WILLIAM R. SMITH
NEAL L. WALTERS

BY John B Frisone
ATTORNEY

FIELD-EFFECT PERFORATED MEDIA READER

BACKGROUND OF THE INVENTION

1. Field of the Invention

The invention relates to perforated media readers in general and more particularly to perforated media readers employing field effect devices as perforation sensors.

2. Description of the Prior Art

Perforated media of various types have been used for storing binary coded data for many years. Various well-known reading techniques have been used. Each of these techniques has unique advantages and disadvantages. The electromechanical types are quite reliable in operation, however, they are subject to wear, misalignment and generally require large forces especially when used to read perforated cards having in excess of 1,000 sensors arranged in parallel.

Card readers utilizing the media or its absence to change the dielectric constant of capacitive elements have also been used. These devices require critical and expensive sensing amplifiers to operate properly and therefore have not found general use. In addition, under adverse environmental conditions, operation is at best marginal.

SUMMARY OF THE INVENTION

The invention contemplates a perforated media reader comprising a plurality of spaced semiconductor elements arranged in a substantially planar array, each of which includes a lightly doped semiconductor substrate such as silicon into which two spaced opposite conductivity regions have been diffused, an insulating layer covering one surface of the substrate contiguous with the area between said spaced regions, means for applying a first voltage source to one of said electrodes and a second voltage source of opposite polarity to said other electrode, a perforated media including a conductive surface in intimate contact with said insulating layers and means for applying a third voltage source to said conductive surface of said media when positioned whereby signals are developed at each said second electrode indicating the presence or absence of the said conductive surface in the area contiguous with the said insulating layer.

One object of the invention is to provide a perforated media reader in which no moving parts are used to sense the perforations or lack thereof.

Another object of the invention is to provide a perforated media reader which is reliable in operation under adverse environmental conditions.

A further object is to provide a perforated media reader which is inexpensive to manufacture and is long lived since it does not rely on electromechanical sensing elements.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
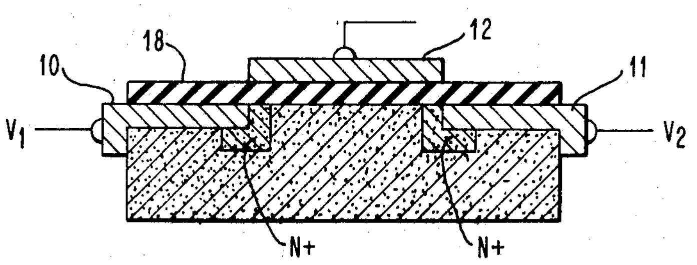
FIGS. 1 and 2 are schematic diagrams illustrating the construction of a conventional metal-oxide-semiconductor (MOS) field-effect transistor in two different modes of operation.

FIG. 1 is a schematic diagram of a conventional N-channel MOS transistor operating in the enhancement mode. The voltage $V_1$ and $V_2$ applied to electrodes 10 and 11 are selected so that with no voltage on the gate electrode 12, the resistance between the electrodes 10 and 11 is high. As a positive voltage is applied to the gate electrode 12, a negative field is induced in the P-type substrate between the N-type regions diffused into the P-type substrate. When this condition prevails, the resistance between the electrodes 10 and 11 is reduced.

Figure 2:
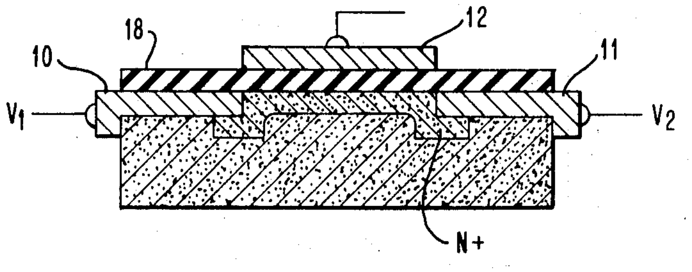

FIG. 2 is a schematic diagram of a conventional N-channel MOS transistor operating in the "pinch-off" mode. Here a conducting channel is provided between the N-type regions and the electrodes 10 and 11 when no voltage is applied to the gate electrode 11. This is accomplished by the appropriate selection of voltages $V_1$ and $V_2$. As a negative voltage is applied to the gate electrode 11, a positive field is induced in the P-type substrate, "pinching-off" current flow between electrodes 10 and 11.

The P-channel type MOS transistor has not been illustrated, however, operation is analogous to the N-channel type described above except that operation is by means of hole conduction rather than electron conduction.

Figure 3:
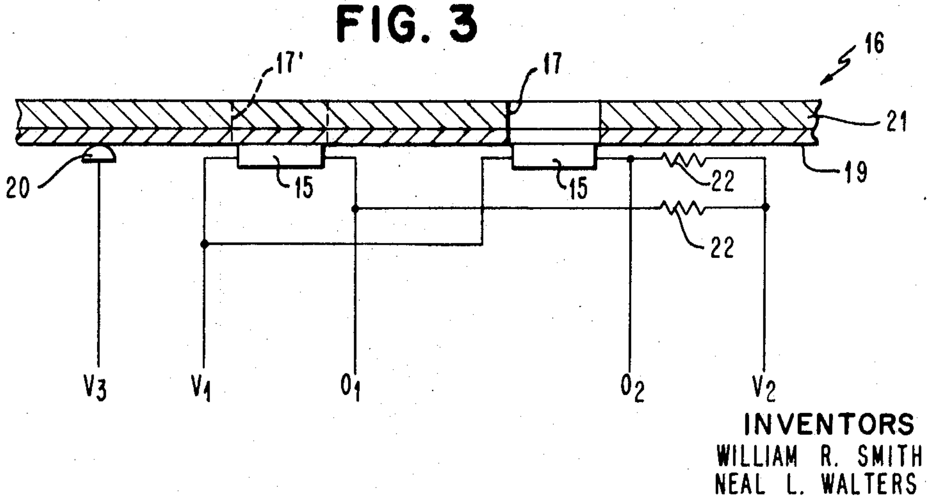
FIG. 3 is a schematic sectional diagram of a novel perforated media reader employing MOS field-effect transistors; and, FIGS. 4–6 illustrate the invention applied to three different types of perforated media readers.

In FIG. 3, a plurality of semiconductor devices 15 are arranged in a substantially planar array and supported by means not shown for the sake of clarity. These semiconductor devices are identical in structure to those illustrated in FIGS. 1 and 2, however, the gate electrode 12 has been omitted in its entirety.

A selectively perforated media 16 is positioned in registration over the planar array of semiconductor devices 15 so that the hole areas 17 and 17' for nonperforated areas overlie the insulated gate areas 18 (FIGS. 1 and 2) of the semiconductor device in registration therewith. The media 16 includes an electrically conductive portion 19 in intimate contacts with the insulated gates 18 of the semiconductor devices 15 and in contact with an electrode 20 connected to voltage source $V_3$. Media 16 also includes a nonconductive layer 21 which provides support for conductive layer 19. The media could be made of a single layer of electrically conductive material. In practice, however, a laminated media having a paper stock layer and metal foil layer joined appears to provide the best performance for cost of construction.

Similar electrodes of semiconductor devices 15 are connected to the source $V_1$ while the other electrodes are connected via resistors 22 to the source $V_2$. When the card is brought into position, those devices 15 adjacent a perforation will provide a detectable output on lines $O_1$ and $O_2$ when devices 15 are operated in the "pinch-off" mode and those devices 15 adjacent nonperforated areas will provide a detectable output on lines $O_1$ and $O_2$ when devices 15 are operated in the enhancement mode. The detectable output is the voltage across resistors 22 which occurs when the associated device 15 presents a low impedance between electrodes 10 and 11 causing that point to approach the voltage of source $V_1$. Resistors 22 limit the current flow when a device 15 changes from a high impedance state to a low impedance state.

Figure 4:
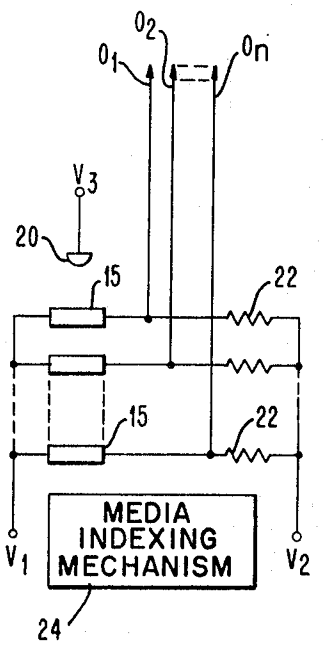

In FIG. 4, a perforated media reader includes a single column of semiconductor devices 15 equal in number to the number of digits or rows utilized in the media. The electrodes 10 are connected in parallel to voltage source $V_1$ and the electrodes 11 are connected via current limiting resistors 22 to voltage source $V_2$. When the media is in the reading position, voltage source $V_3$ is connected to the conductive surface of the media by electrode 20. A conventional media indexing mechanism 24 such as a punched paper tape transport or a column by column card reader advances the media through the reading position a row at a time. Each time the media is advanced, the outputs $O_1$–$O_n$ are sampled and the perforations are detected.

Figure 5:
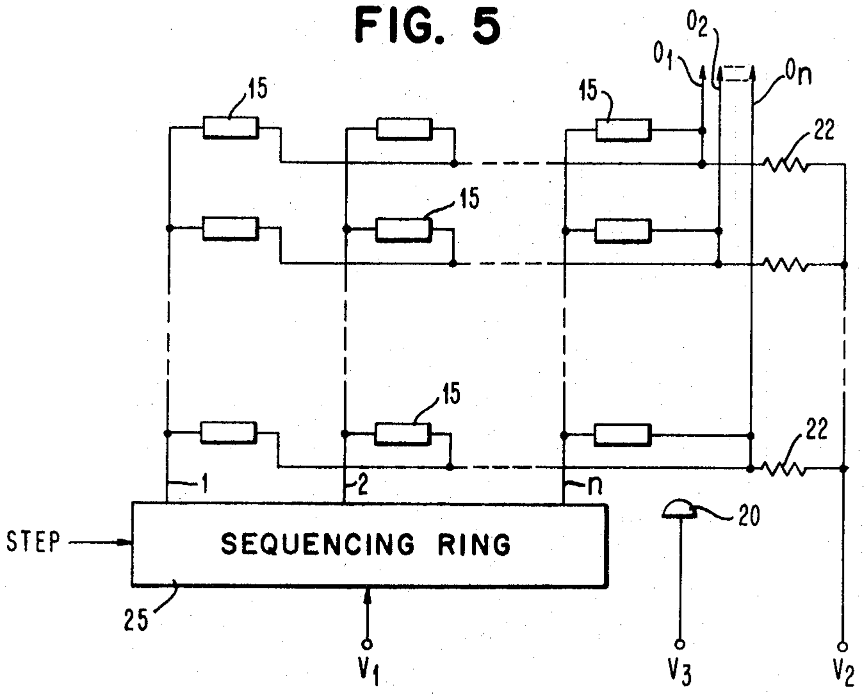

The reader illustrated in FIG. 5 is an all electrical equivalent of the electromechanical reader illustrated in FIG. 4 and particularly suitable for reading card-type perforated media. It includes a semiconductor device 15 for each data position on the card. These are arranged in a rectangular matrix of rows and columns so as to be in registration with the data positions on the media when the media is positioned over the matrix.

A sequencing ring circuit 25 has as many outputs or positions as there are rows and sequentially connects voltage source $V_1$ to electrodes 10 of semiconductor devices 15 of the sequential rows. Corresponding electrodes 11 in the rows are connected in parallel and by a resistor 22 to voltage source $V_2$. The voltage source $V_3$ is applied to the conductive layer of the card when positioned by electrode 20 as previously described.

A step signal is applied to the sequencing ring 25 and sequentially connects outputs 1–n to source $V_1$. At each step in the sequence outputs $O_1$–$O_n$ develop outputs indicative of the perforations in the column being read. Knowledge of the position of sequencing ring 25 and the outputs generated at $O_1$–$O_n$ provides the information recorded on the perforated media in registration with devices 15. This arrangement requires no moving mechanical parts for generating a column by column card reader function.

Figure 6:
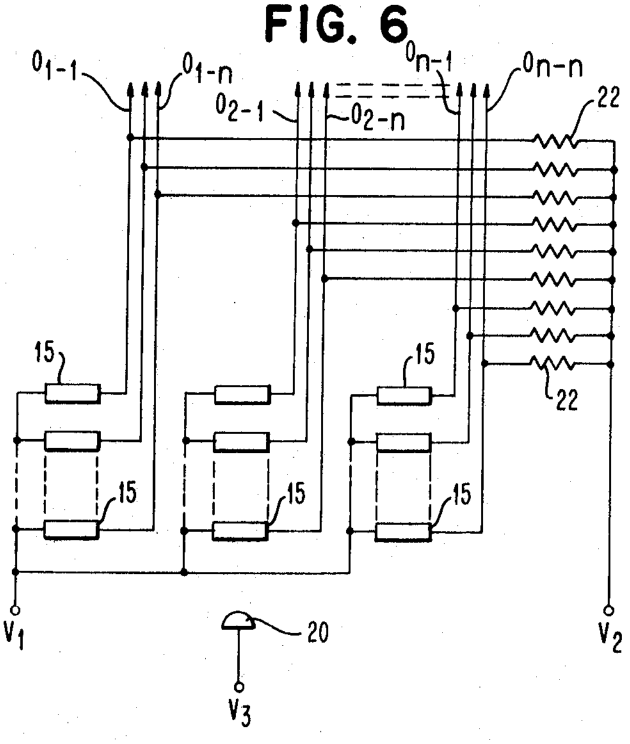

The reader illustrated in FIG. 6 provides a parallel read of each data position on the media. It includes a rectangular matrix of semiconductor devices 15. Electrodes 10 are connected in parallel to source $V_1$. The electrodes 11 are each connected by a resistor 22 to source $V_2$ and an output ($O_{1-1}O_{1-n}$, $O_{2-1}$–$O_{2-n}$ to $O_{n-1}$–$O_{n-n}$) is connected to each electrode 11. Thus when the media is positioned, each output indicates the status of its corresponding data position on the media, i.e., perforated or unperforated.

While the invention has been particularly shown and described with reference to preferred embodiments thereof, it will be understood by those skilled in the art that various changes in form and details may be made therein without departing from the spirit and scope of the invention.

What is claimed is:

1. A perforated media reader for reading a selectively perforated planar media having at least one planar surface made of electrically conductive material comprising:

a plurality of spaced semiconductor devices arranged in a substantially planar array, each of said devices including, a lightly doped semiconductor substrate into which two spaced opposite conductivity regions have been diffused, an insulating layer covering one surface of the substrate contiguous with the area between said spaced regions, and a pair of electrodes each contacting one of the said spaced regions;

means for applying a first voltage to one of said electrodes and a second voltage of opposite polarity to said other electrodes; and means for applying a third voltage to the conductive surface of a perforated media when the conductive surface of the said media is operatively positioned in direct physical contact with the insulating layers of the semiconductor devices whereby signals are developed at each said second electrode indicating the presence or absence of the conductive surface of the media in the area contiguous with the associated insulating layer.

2. A perforated media reader as set forth in claim 1 in which said semiconductor substrate is silicon.

3. A perforated media reader as set forth in claim 2 in which said plurality of semiconductor devices are arranged in a column, said first voltage is applied in parallel to said one electrodes and said other electrodes are each connected to the second voltage source by a current limiting impedance whereby the media may be read one column at a time by transporting it past the reading device.

4. A perforated media reader as set forth in claim 2 in which said plurality of semiconductor devices are arranged in a rectangular matrix, said means applying a first voltage to the one electrodes includes a sequencing means for applying the first voltage to the said one electrodes in each column of the matrix in sequence and the said other electrodes are connected to the second voltage source at all times, said other electrodes in each row of the matrix are connected in parallel and to the second voltage source via a current limiting impedance whereby the columns of the perforated media are read sequentially.

5. A perforated media reader as set forth in claim 2 in which said plurality of semiconductor devices are arranged in a rectangular matrix, said first voltage source is applied in parallel to said one electrodes and each said other electrode is connected to the second voltage source by a current limiting impedance whereby all data positions on the media corresponding to the semiconductor device locations are read simultaneously.

6. A perforated media and reader therefor comprising:

a plurality of spaced semiconductor devices arranged in a substantially planar array, each of said devices including, a lightly doped semiconductor substrate into which two spaced opposite conductivity regions have been diffused, an insulating layer covering one surface of the substrate contiguous with the area between said spaced regions, and a pair of electrodes each contacting one of the said diffused regions;

means for applying a first voltage to one of said electrodes and a second voltage of opposite polarity to said other electrode;

a selectively perforated planar media having at least one planar surface made of electrically conductive material, said conductive surface being placed in direct physical contact with said insulating layers; and means for applying a third voltage to said conductive surface of said media when operatively positioned whereby signals are developed at each said second electrodes indicating the presence or absence of the said conductive surface in the area contiguous with the said associated insulating layer.

7. A perforated media reader as set forth in claim 6 in which said semiconductor substrate is silicon.

8. A perforated media reader as set forth in claim 7 in which said plurality of semiconductor devices are arranged in a column, said first voltage is applied in parallel to said one electrodes and said other electrodes are each connected to the second voltage source by a current limiting impedance whereby the media may be read one column at a time by transporting it past the reading device.

9. A perforated media reader as set forth in claim 7 in which said plurality of semiconductor devices are arranged in a rectangular matrix, said means applying a first voltage to the one electrodes includes a sequencing means for applying the first voltage to the said one electrodes in each column of the matrix in sequence and the said other electrodes are connected to the second voltage source at all times, said other electrodes in each row of the matrix are connected in parallel and to the second voltage source via a current limiting impedance whereby the columns of the perforated media are read sequentially.

10. A perforated media reader as set forth in claim 7 in which said plurality of semiconductor devices are arranged in a rectangular matrix, said first voltage source is applied in parallel to said one electrodes and each said other electrode is connected to the second voltage source by a current limiting impedance whereby all data positions on the media corresponding to the semiconductor device locations are read simultaneously.

* * * * *